United States Patent [19]
Jaynes et al.

[11] Patent Number: 5,317,626
[45] Date of Patent: May 31, 1994

[54] WAKE-UP AND REMINDER SYSTEM FOR A TELEPHONE

[76] Inventors: Brian Jaynes, 121 Piedmont Ave., Hampton, Va. 23661; Steven Slowikowski, 709B Poquoson Ave., Poquoson, Va. 23662

[21] Appl. No.: 699,251

[22] Filed: May 13, 1991

[51] Int. Cl.$^5$ .................. H04M 1/64; H04M 9/00
[52] U.S. Cl. ............................. 379/67; 379/68; 379/41; 379/51; 379/69; 379/110
[58] Field of Search ............ 379/67, 68, 110, 41, 379/51, 69, 70, 101

[56] References Cited

U.S. PATENT DOCUMENTS

| | | | |
|---|---|---|---|
| 3,029,593 | 4/1962 | Gerace | 379/110 |
| 3,294,910 | 12/1966 | Jackson | 340/309.15 |
| 3,510,591 | 5/1970 | Klein | 379/69 |
| 3,943,288 | 3/1976 | Reed et al. | 379/110 |
| 4,480,154 | 10/1984 | Klee | 379/373 |
| 4,503,288 | 3/1985 | Kessler | 379/104 |

FOREIGN PATENT DOCUMENTS 0058652 3/1991 Japan ..................... 379/110

*Primary Examiner*—James L. Dwyer
*Assistant Examiner*—Fan Tsang
*Attorney, Agent, or Firm*—Wegner, Cantor, Mueller & Player

[57] ABSTRACT

A wake-up and reminder system for a telephone takes advantage of the attention-drawing characteristics of the telephone ringer to awaken and/or remind a person of various tasks or appointments. The wake-up and reminder system for a telephone is provided with modular jacks for connecting between the telephone and the wall jack. A timer is provided for establishing an alarm time, and a relay responsive to the timer is provided for disconnecting the telephone temporarily from the telephone line. The system includes a ringing device for ringing the telephone at a predetermined rate and an off-hook detection circuit for detecting when the telephone has been taken off the hook. In addition, a second relay is provided responsive to the off-hook detection circuit for disconnecting the telephone from the ringing device and connecting the telephone to a recorder which plays a pre-recorded message. Lastly, a reset device is included which is responsive to the off-hook detection circuit for resetting the system when the telephone has been hung up.

12 Claims, 4 Drawing Sheets

WAKE-UP AND REMINDER SYSTEM FOR A TELEPHONE

BACKGROUND OF THE INVENTION

It is generally known to use telephones for wake-up calls and reminders. telephone wake-up services have become quite popular in many cities and towns around the country. The system of the present invention allows a person the conveniences of theses services without the cost.

SUMMARY OF THE INVENTION

A wake-up and reminder system for a telephone uses the attention-drawing characteristics of a telephone ringer to awaken and/or remind a person of variousa tasks or appointments. The invention relates to a telephone wake-up and reminder system with convenience features, which is compatible with current telephone technology. Mor particularly, the invention relate to a wake-up and reminder system for a telephone which is connectable in a telephone line, comprising means for connecting the system to the telephone line; means for connecting the system to the telephone; timer means for establishing an alarm time; first relay means responsive to the timer means for disconnecting the telephone temporarily from the telephone line; ringing means for ringing the telephone at a predetermined rate; off-hook detection means for disconnecting the telephone from the ringing means and connecting the telephone to a recorder means for playing a prerecorded message; and reset means responsive to said off-hook detection means for resetting the system.

DETAILED DESCRIPTION OF THE INVENTION

Figure 1:
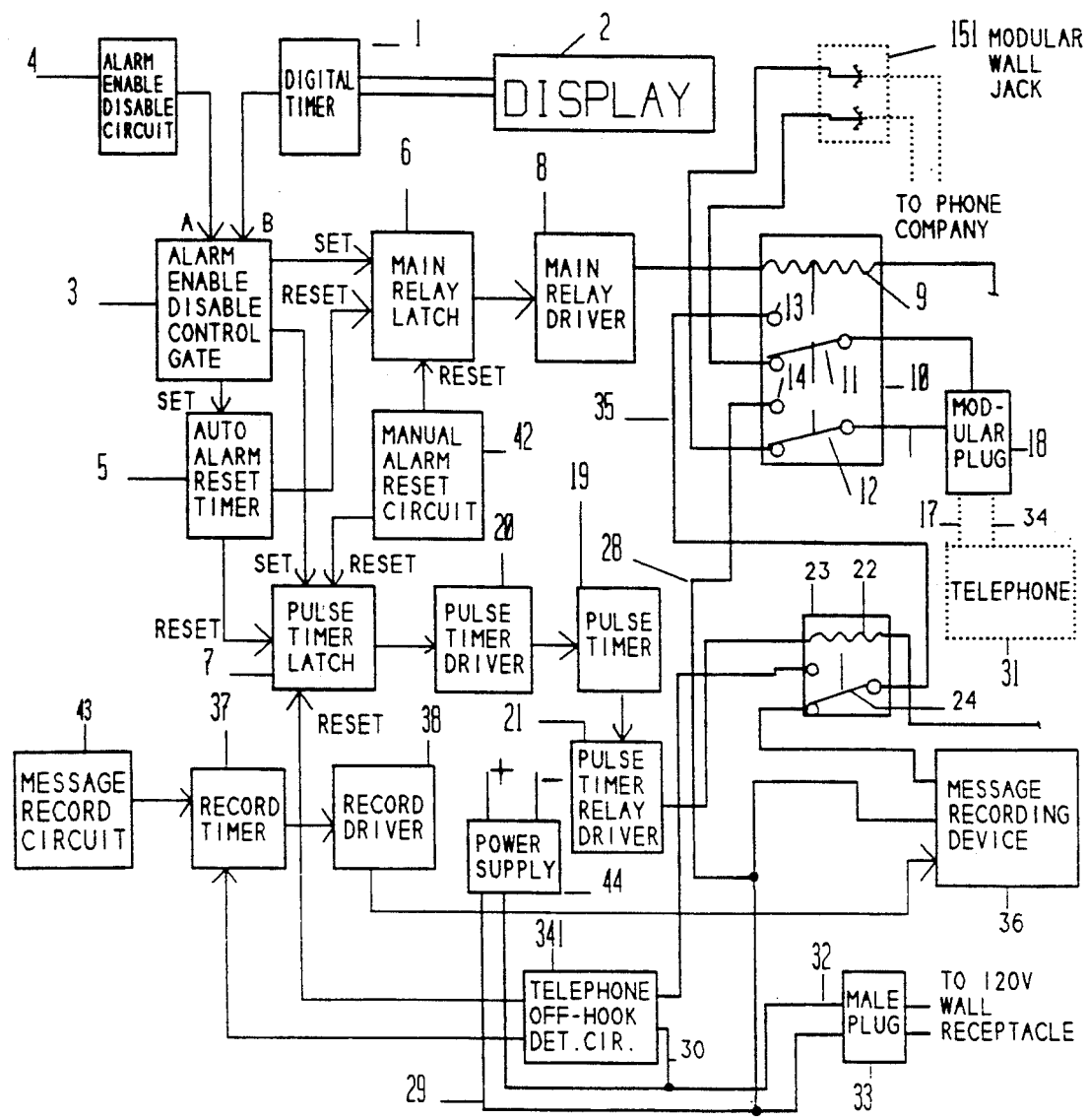
FIG. 1 is a simplified modular block diagram according to one embodiment of the invention.
Figure 6:
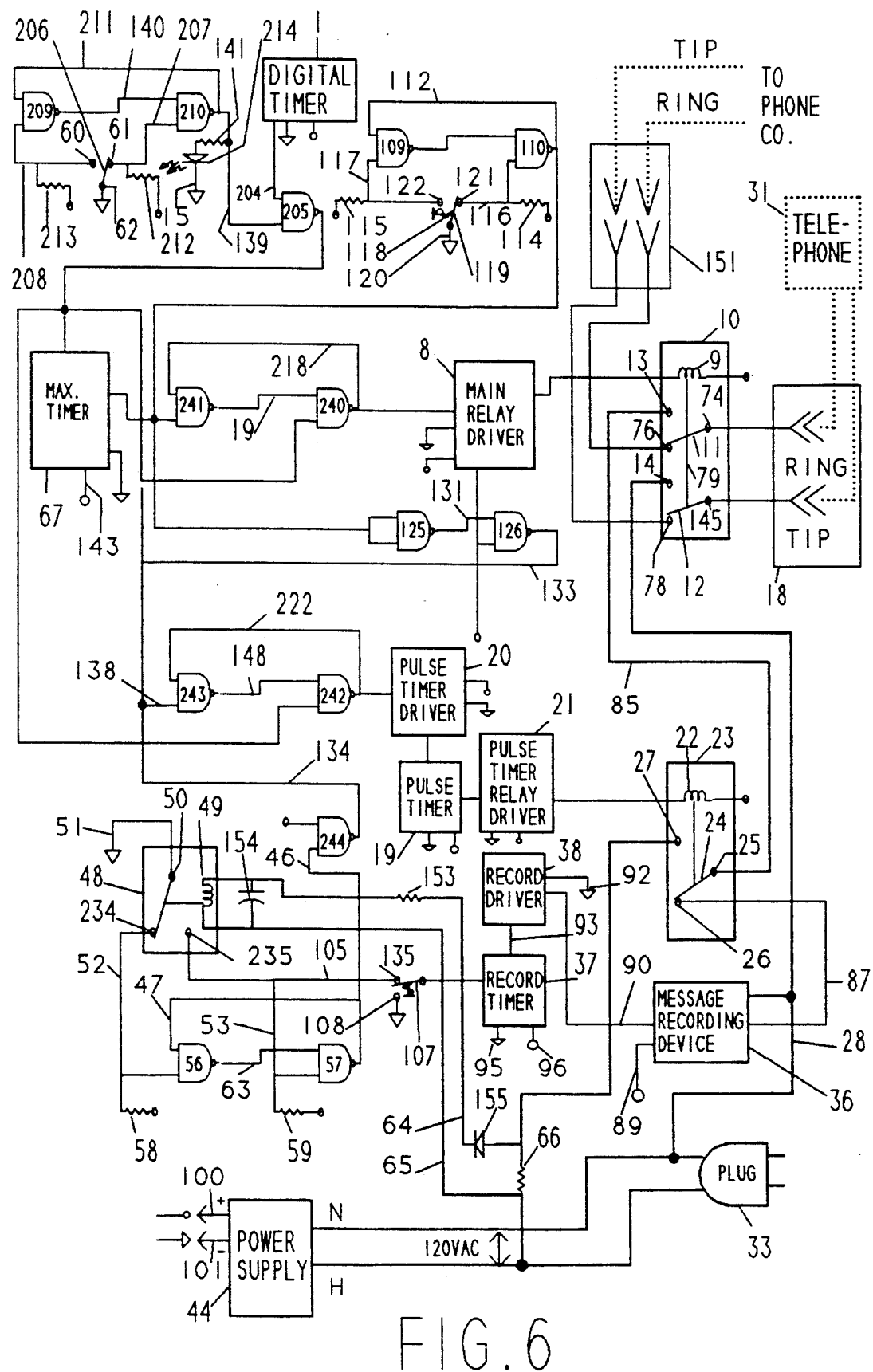
FIG. 6 is a detailed schematic diagram according to the one embodiment of the invention.

FIG. 1 is a simplified modular block diagram of a preferred embodiment of the invention. The individual components forming the modules are not shown in this figure for simplicity. A detailed schematic diagram of the preferred embodiment of the components is shown in FIG. 6.

The digital timer indicated at numeral 1 in FIG. 1 is a multi-event, multi-day timer. Digital Timer 1 contains all of the circuitry needed to set alarm time(s), and is designed to be compatible with the available voltage and current.

The display 2 is a digital LED or LCD which constantly displays the present time and which can also display alarm times when desired.

The Alarm Enable/Disable Circuit 4 is a device which holds input A of the Alarm Enable Control Gate 3 in the proper state to enable or disable the alarm. The Alarm Enable/Disable Circuit is also provided with an LED for indicating the enable state of the alarm. When the Alarm Enable/Disable Circuit 4 is in the enable position (which is preferably accomplished manually) and Digital Timer 1 triggers the Alarm Enable Control Gate 3, the output of Alarm Enable Control Gate 3 triggers the proper components to bring the system into Alarm Mode. When the Alarm Enable/Disable Circuit 4 is in the disable position, the output of the Alarm Enable Control Gate 3 is not affected by triggering of the Digital Timer 1, and thus the system remains in Reset Mode.

When the system is brought into Alarm Mode, Auto Alarm Reset Timer 5 is triggered and Main Relay Latch 6 and Pulse Timer Latch 7 are set. The Main Relay Latch 6 energizes Coil 9 of Main Relay 10 via the Main Relay Driver 8, thus switching blades 11 and 12 to Normally Open Contacts 13, 14 to prevent feedback to the Telephone Company and to connect the telephone to the device of the invention. The Pulse Timer Latch 7 energizes Pulse Timer 19 via the Pulse Timer Driver 20, which in turn energizes Coil 22 of Pulse Timer Relay 23 via Pulse Timer Relay Driver 21. The Coil 22 is energized for two seconds and de-energized for four seconds, and thus the blade 24 of the Pulse Timer Relay 23 is actuated accordingly.

When Blade 12 is actuated in the Alarm Mode as described above, Tip Line 17 of the telephone is connected via Contact 14 and Conductor 28 to the neutral line 29 of the 120 V.A.C. supply line. The supply line is connected to wall voltage via a male plug 33. When Blade 24 is actuated as described above, the Hot Line 32 of the 120 V.A.C. supply line is connected to Telephone Ring Line 34 via the Off-Hook Detection and Trigger Circuit 341. The Off-Hook Detection and Trigger Circuit 341 contains a Resistor which lowers the ringing voltage to approximately 90 volts.

When the Telephone Ring Line 34 is connected as described above, the telephone rings as if there were an incoming call. When the telephone handset is lifted from the cradle (not shown), the resistance of the telephone drops and a surge of current flows. This resistance drop is detected by the Off-hook Detection and Trigger Circuit 341, which triggers the Pulse Timer Latch 7 to reset. This de-energized Pulse Timer 19 via Pulse Timer Driver 20, which in turn de-energizes Coil 22 of Pulse Timer Relay 23, returns blade 24 to its normal position, and disconnects the ringing voltage from the telephone.

Figure 2:
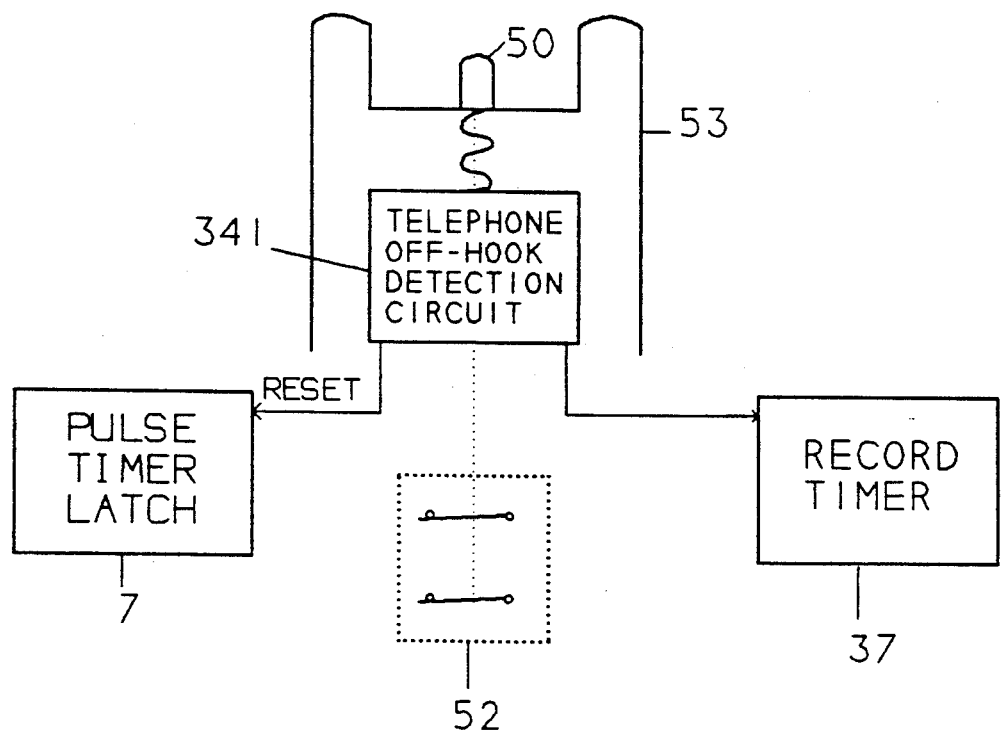
FIG. 2 is a partial schematic block diagram according to another embodiment of the invention.

In another embodiment of the invention, the Off-Hook Detection and Trigger Circuit 341 is simplified by being activated mechanically by cradle button 50 or hook switch 52 (depending upon the type of telephone) when the system is constructed within a telephone as shown in FIG. 2.

Once the handset has been lifted from the cradle or hook and the ringing voltage has been disconnected, the Pulse Timer Latch 7 is reset and the Recorder Timer 37 is triggered, thus entering the device into Playback Mode. The Recorder Timer 37 will energize Recorder 36 via Recorder Driver 38 for approximately ten seconds. Since the Recorder 36 is connected to Tip Line 17 and Ring Line 34 of the Telephone 31, when the Recorder is energized a ten second prerecorded message will play back over the telephone. Recorder 36 is connected to the telephone 31 through the Normally Closed Contact 26 of Pulse Timer Relay 23 so as to prevent the line voltage (120 VAC) from damaging recorder circuits.

The pre-recorded message may, for instance, be a reminder message or some other predetermined signal. The Recorder may also be replaced with a simple tone-sounding device sufficient to inform the user that the ringing is not a "hang-up" call.

Figure 3:
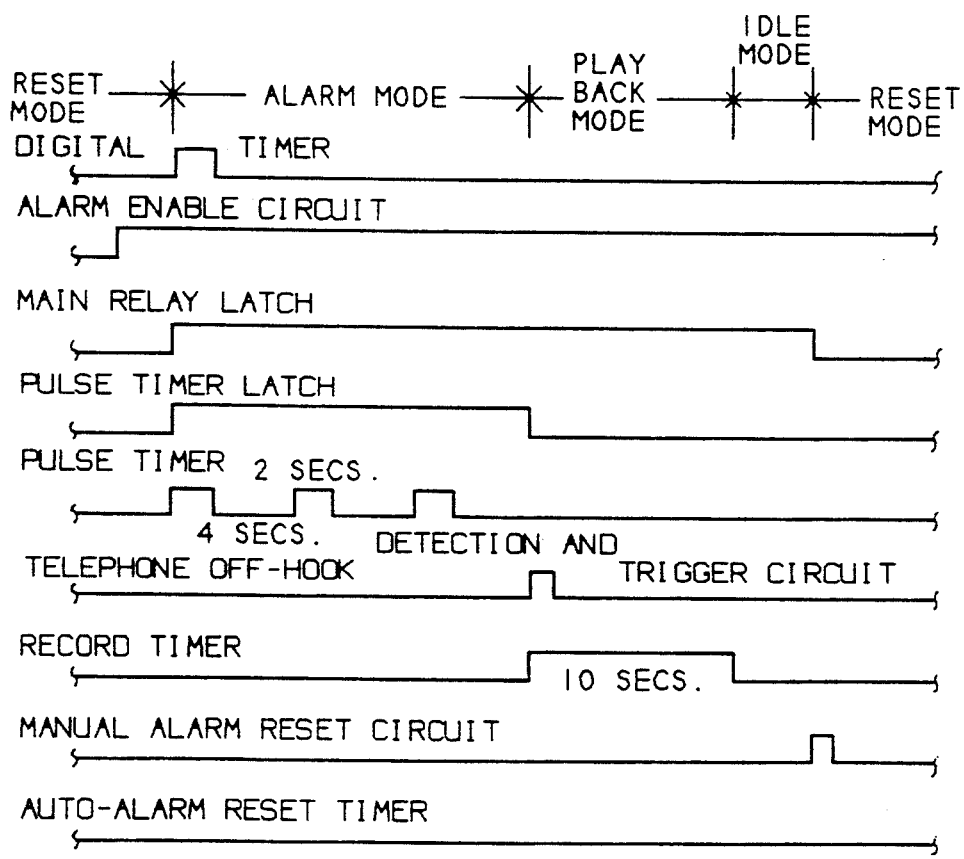
FIG. 3 is a timing diagram showing system reset using the handset.
Figure 4:
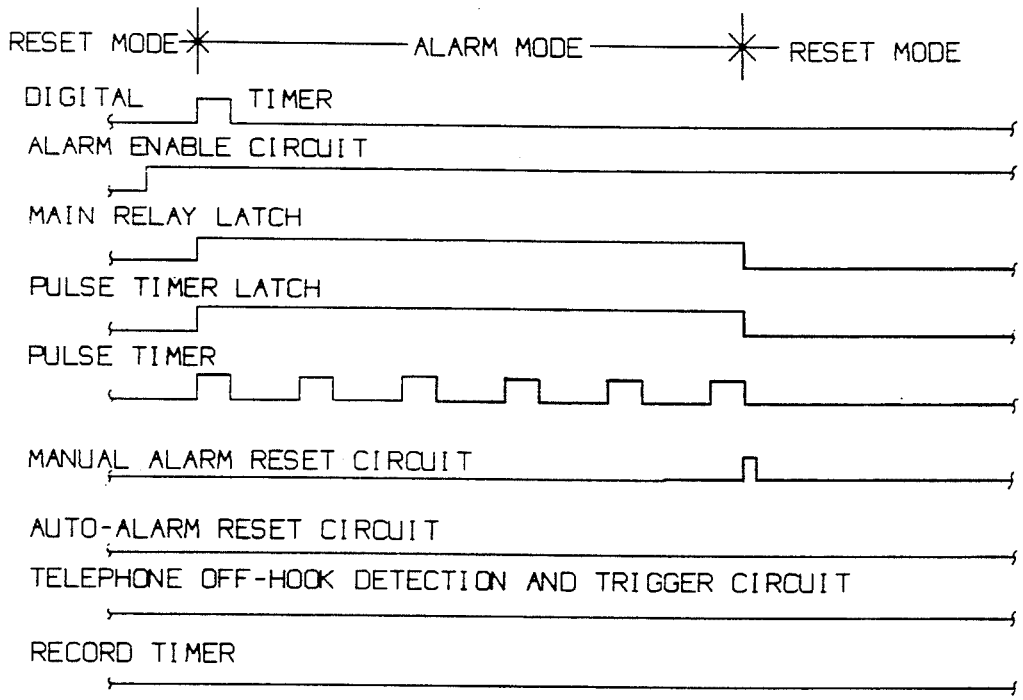
FIG. 4 is a timing diagram showing system reset using the manual alarm reset circuit.

When the message is completed, the device is in "Idle Mode". Manual Alarm Reset Circuit 42 is activated by pressing a push button switch or other suitable means. This in turn resets Main Relay Latch 6 which de-energizes Coil 9 of Main Relay 10, and returns Blades 11 and 12 to their normal position so as to return the telephone to normal operation. This is called "Reset Mode". A timing diagram of the alarm sequence up to and including system reset using the handset is shown in FIG. 3. Upon actuation of the alarm, the Reset Mode could be entered directly without lifting the handset by simply activating Manual alarm Reset Circuit 42, thus bypassing the Playback Mode. A timing diagram for this sequence is shown in FIG. 4.

Figure 5:
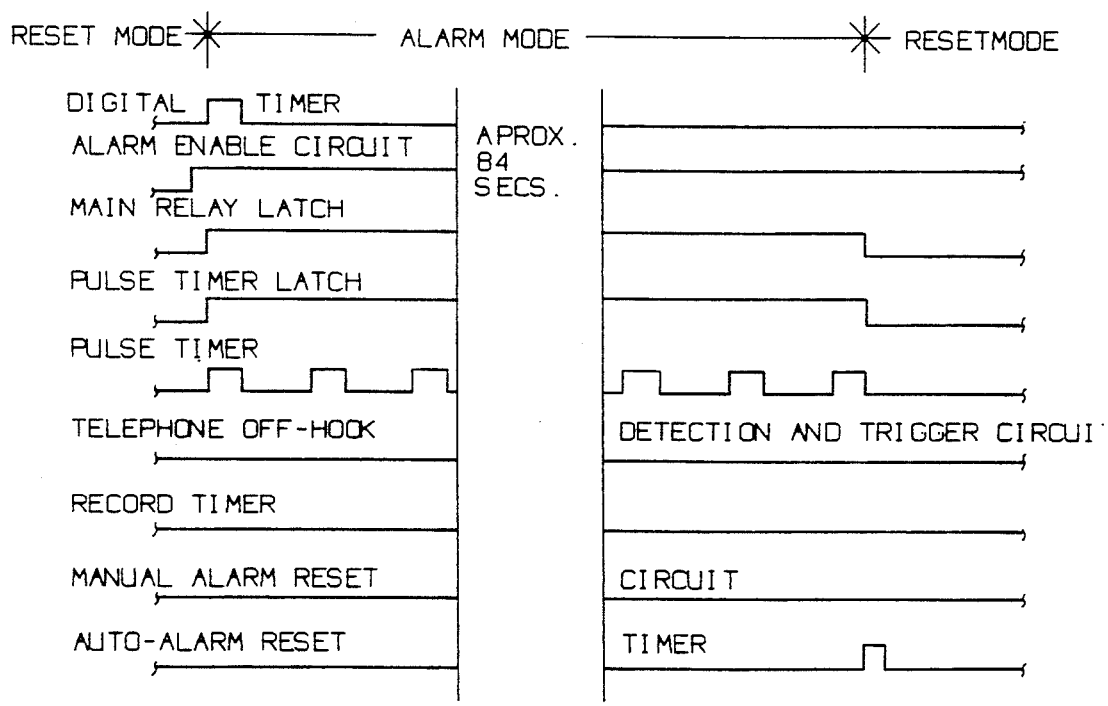
FIG. 5 is a timing diagram showing system reset by the auto alarm reset timer.

As explained above, the Auto Alarm Reset Timer 5 is triggered when Digital Time 1 pulses and brings the system into Alarm Mode. The Auto Alarm Reset Timer 5 allows the system to ring the telephone for only a predetermined amount of time (approximately 120 seconds or twenty rings), and then returns the system to Reset Mode by resetting Main Relay Latch 6 and Pulse Timer Latch 7. Thus, the Auto Alarm Reset Timer 5 prevents the system from ringing the telephone too long in the case it is activated when the user is absent. A timing diagram for this sequence is shown in FIG. 5.

Message Recording Circuit 43 allows a user to pre-record messages by placing the recorder in Record Mode and pressing a push button switch or other suitable means. When this occurs, the Recorder Timer 37 will energize Recorder 36 via Recorder Driver 38 and allow the user to record a desired number of ten-second messages sequentially. This recorder could be replaced with only minor modifications to the system with a log and file system wherein messages could be recorded and played back out of order.

FIG. 6 is a detailed schematic diagram of the preferred embodiment of the invention. Identical elements in FIGS. 1 and 6 are referred to with the same reference numbers.

A power supply 100 is provided which converts line voltage received from plug 33 into an appropriate voltage for the various system components.

The output of Digital Timer 1 is connected to one input of Gate 205 via Conductor 204. During normal operation, the output of Digital Clock 1 is low and holds the input B of Gate 205 low. The Alarm Enable Switch 206 is connected to the other input terminal of Gate 205 via Gates 209 and 210. The Common Contact 62 of Alarm Enable Switch 206 is connected to ground, while the Disable Contact 60 is connected to one input of Gate 209 via Conductor 208. This input of Gate 209 is thus pulled low when Disable Contact 60 is closed, and pulled high when Disable Contact 60 is open. A Pull-up Resistor 213 is provided along Conductor 208 to hold the input of Gate 209 high when Contact 60 is open to prevent the input from floating. The other input of Gate 209 is connected to the output of Gate 210 via Conductor 211. The output of Gate 209 is connected to one input of Gate 210 via Conductor 140, and the Enable Contact 61 of Alarm Enable Switch 206 is connected to the other input via Conductor 207 to prevent floating of the input.

The connections and circuitry previously explained form a latch at the output of Gate 210. When Enable Contact 61 is closed, the output of Gate 210 is held high. When the alarm enable switch is in the disable position and Contact 60 is closed, the output of Gate 210 is latched low.

The output of Gate 210 is connected to one input of Gate 205 via Conductor 139. An LED 214 is connected to Conductor 139 via a Current Limiting Resistor 141. This LED illuminates when the alarm enable switch is in the enable position. If the alarm enable switch is in the disable position when the present alarm time is reached, the Digital Timer 1 will pulse high at the input of Gate 205 and, since the other input of Gate 205 remains low, the output of gate 205 will remain high and the alarm circuitry will not be triggered. But, if the alarm enable switch is in the enable position when the present alarm time is reached, when the Digital Timer 1 pulses high the output of gate 205 will pulse low, thus bringing the device into Alarm Mode.

The output of Gate 205 is connected to input B of Gate 240, to input B of Gate 242, and to the input trigger of Maximum Timer 67. Therefore, a low pulse from Gate 205 triggers three components simultaneously.

Gates 240 and 241 are connected so as to form a NAND latch. The negative pulse to input B of Gate 240 latches the output of Gate 240 high, which causes Relay Driver 8 to energize Coil 9 of Relay 10. Relay 10 is of the double-pole, double-throw type. Relay Driver 8 has a sufficient rating to energize Coil 9 of the Relay 10. Common Point 74 of Blade 11 is connected via Modular Jack 18 to the ring line of Telephone 31. Common Point 145 is connected via Modular Jack 18 to the Tip Line of Telephone 31. Normally Closed Contact 76 is connected via Modular Wall Jack 151 to the ring line from the telephone company. Normally Closed Contact 78 is connected to the tip line from the telephone company via the Modular Wall Jack 151.

The system is in Standard Mode when Coil 9 is de-energized and the Contacts 76 and 78 allow normal telephone operation. When Coil 9 is energized, Blades 11 and 12 are switched simultaneously due to Mechanical Interlock 79, thereby closing Normally Open Contacts 13 and 14. This disconnects the incoming telephone lines from the telephone to prevent current from feeding back to the telephone company. Normally Open Contact 14 is connected via Conductor 28 to the neutral side of the line supply.

Gates 242 and 243 are connected in a latch configuration via Conductors 222 and 148 in the same manner as Gates 240 and 241 explained above. When Digital Timer 1 pulses high, the output of Gate 242 is latched high. When this occurs, the Pulse Timer 19 is energized by the Pulse Timer Driver 20, and pulses high for two seconds and low for four seconds. This pulse train is sent to Pulse Timer Relay driver 21, which energizes Coil 22. This causes Blade 24 to close Normally Open Contact 27, which is connected to via resistor 66 to the high side of the line supply. Resistor 66 serves to lower the ringing voltage across the telephone. The Common Point 25 of Relay 23 is connected to Relay 10 as described above with reference to FIG. 1.

Max Timer 67 is a cascaded timer which is triggered when Gate 205 pulses low. The first timer goes high for approximately 120 seconds. When the first timer falls low, the second timer pulses low at the output, which is connected to input B of Gate 241. This latches the output of Gate 240 low, which in turn de-energizes Coil 9 of Relay 10. The low pulse from Max Timer 67 is also sent to inputs A and B of Gate 125, the output of which is connected to input A of Gate 126. With input B of Gate 126 held high, two high inputs result in a low output which is sent to input B of Gate 243. This latches the output of Gate 242 low and de-energizes Coil 22 of Relay 23, thus bringing the system back to the Reset Mode. The Max Timer system is a safety feature which allows the alarm system to ring the telephone approximately twenty times and then returns the system to Reset Mode in the case that no one was available to prevent the telephone from possibly ringing for hours.

Alarm Reset Switch 119 is a single-pole, double-throw, springloaded push button switch that is connected to Gates 109 and 110 to form a latch. With Alarm reset switch 119 in its normal position, the output of Gate 110 is held high. When the system is in Alarm Mode and the Alarm reset switch is pressed, input B of Gate 109 is brought low and latches the output of Gate 110 low. When the alarm reset switch is released, the output of Gate 110 returns to the high state. The momentary low pulse at the output of Gate 110, which is connected to the input of Gate 125, returns the system to Reset Mode in the same manner as described for Max Timer 67.

Relay 48 is a single-pole, double-throw relay. Its contacts are connected with Gates 56 and 57 to form a latch. Pull-up Resistors 58 and 59 are provided to prevent floating of the inputs. Coil 49 is connected in parallel with Resistor 66. A Diode 155, Capacitor 154, a Resistor 153, or a combination thereof may have to be added depending on the type of relay chosen for Relay 48.

The resistance of Resistor 66 is calculated to ensure a proper voltage drop to allow the telephone to ring and to activate Coil 49 of Relay 48. With the system in Alarm Mode, the telephone rings and a person awakes and lifts the receiver. The on-hook condition of a telephone has a much higher resistance than the off-hook condition, so that when the receiver is lifted, the surge of current quickly energized Coil 49. In the normal operating condition, the output of Gate 57 is low and is carried to input B of Gate 244. Input A of Gate 244 held high. When Relay 48 is switched, the output of Gate 57 becomes high. With two high inputs to Gate 244, the output becomes low. This low output is carried to input B of Gate 243, thus latching the output of Gate 242 low and de-energizing Coil 22 of Relay 23. When Contact 55 of Relay 48 is momentarily closed, it sends a low pulse via Conductor 105 through normally closed Contact 235 to Recorder Timer 37.

Recorder Timer 37 is a mono-stable multi-vibrator which delivers an output pulse that lasts approximately ten seconds for every input pulse. Conductor 96 is connected to positive said DC power supply 100. Conductor 95 is connected to ground. The low pulse delivered to Recorder Timer 37 triggers the Recorder Driver 38 to energize Recorder 36 via Recorder Driver 38. The recorder then sends a ten second pre-recorded message over the telephone. When the message ends, the system is brought back to Reset Mode by pressing alarm reset switch 119. Recorder 36 can also be a tone sounding or prerecorded chip to let the user know that it is not a hang-up call. Switch 107 is a single-pole double-throw momentary-on push button switch. The purpose of this switch is to trigger Recorder Timer 37 and energize the recording device as previously explained. This enables the user to record messages to put into recording device.

Although the disclosed embodiments show a device which is connected externally to a telephone, the device of the invention may be formed integrally with a telephone, thus requiring connection of only a line voltage plug and a modular phone plug.

While there is shown and described present embodiments of the invention, it is to be distinctly understood that the invention is not limited thereto, but may be otherwise variously embodied and practiced within the scope of the following claims.

What is claimed is:

1. A wake-up and reminder system for a telephone comprising:
   means for connecting the system to the Central Office via a telephone line;
   means for connecting the system to the telephone;
   timer means for establishing an alarm time;
   first relay means responsive to said timer means for disconnecting the telephone temporarily from the Central Office;
   means for energizing a telephone ring line upon establishment of an alarm time by said timer means so that the telephone will ring at a predetermined rate upon reaching the alarm time;
   off-hook detection means for detecting when the telephone has been taken off the hook; and
   second relay means responsive to said off-hook detection means for disconnecting the telephone from the ring line and connecting the telephone to an internal recorder means disposed within the system for playing a prerecorded message.

2. A wake-up and reminder system as claimed in claim 1, further comprising reset means for resetting the system.

3. A wake-up and reminder system as claimed in claim 1, further comprising means for prerecording messages.

4. A wake-up and reminder system as claimed in claim 1, further comprising display means connected to said timer means for displaying current time and alarm time.

5. A wake-up and reminder system as claimed in claim 1, further comprising automatic reset means for automatically resetting the system after the telephone has been rung a predetermined number of times.

6. A wake-up and reminder system as claimed in claim 2, further comprising automatic reset means for automatically resetting the system after the telephone has been rung a predetermined number of times.

7. A telephone including a wake-up and reminder system, comprising:
   means for connecting the telephone to a telephone line;
   timer means for establishing an alarm time;
   first relay means responsive to said timer means for disconnecting the telephone temporarily from the Central Office;
   means for energizing a telephone ring line upon establishment of an alarm time by said timer means so that the telephone will ring at a predetermined rate upon reaching the alarm time;
   off-hook detection means for detecting when the telephone has been taken off the hook; and
   second relay means responsive to said off-hook detection means for disconnecting the telephone from the ring line and connecting the telephone to an internal recorder and means disposed within the system for playing a prerecorded message; and reset means for resetting the system.

8. A telephone including a wake-up and reminder system as claimed in claim 7, further comprising reset bypass means independent of said off-hook detection means for resetting the system regardless of whether the telephone has been taken off the hook.

9. A telephone including a wake-up and reminder system as claimed in claim 7, further comprising means for prerecording messages.

10. A telephone including a wake-up and reminder system as claimed in claim 7, further comprising display means connected to said timer means for displaying current time and alarm time.

11. A telephone including a wake-up and reminder system as claimed in claim 7, further comprising automatic reset means for automatically resetting the system after the telephone has been rung a predetermined number of times.

12. A telephone including a wake-up and reminder system as claimed in claim 8, further comprising automatic reset means for automatically resetting the system after the telephone has been rung a predetermined number of times.

* * * * *